(12) United States Patent
Zhang et al.

(10) Patent No.: US 9,370,767 B2
(45) Date of Patent: Jun. 21, 2016

(54) METAL OXIDE COMPOSITE AND A METHOD OF FORMING THEREOF

(71) Applicant: Nanyang Technological University, Singapore (SG)

(72) Inventors: Lan Zhang, Singapore (SG); Siew Hwa Chan, Singapore (SG); Hongquan He, Singapore (SG)

(73) Assignee: NANYANG TECHNOLOGICAL UNIVERSITY, Singapore (SG)

( * ) Notice: Subject to any disclaimer, the term of this patent is extended or adjusted under 35 U.S.C. 154(b) by 0 days.

(21) Appl. No.: 14/361,654

(22) PCT Filed: Feb. 18, 2013

(86) PCT No.: PCT/SG2013/000063
§ 371 (c)(1),
(2) Date: May 29, 2014

(87) PCT Pub. No.: WO2013/122548
PCT Pub. Date: Aug. 22, 2013

(65) Prior Publication Data
US 2015/0017084 A1 Jan. 15, 2015

Related U.S. Application Data (60) Provisional application No. 61/599,581, filed on Feb. 16, 2012.

(51) Int. Cl.
*C01B 3/00* (2006.01)
*C01B 13/14* (2006.01)
(Continued)

(52) U.S. Cl.
CPC .............. *B01J 23/755* (2013.01); *B01J 23/002* (2013.01); *B01J 23/10* (2013.01); *B01J 23/34* (2013.01);
(Continued)

(58) Field of Classification Search
CPC .......... B01J 23/10; B01J 23/75; B01J 23/755; B01J 37/00; B01J 37/036; B01J 37/038; B01J 37/04; B01J 37/08; Y02E 60/364; C01G 53/04; B82Y 30/00; C01F 17/0043
USPC ......... 502/300, 326, 335, 337, 349, 355, 525; 423/263, 592.1, 594.19, 658.2; 501/80, 501/94, 152
See application file for complete search history.

(56) References Cited

U.S. PATENT DOCUMENTS 2,461,662 A 2/1949 Schlesinger et al.
2,461,663 A 2/1949 Schlesinger et al.
(Continued)

FOREIGN PATENT DOCUMENTS

CN 101104559 A 5/2000
CN 1468826 1/2004
(Continued)

OTHER PUBLICATIONS

Foreign Communication From a Related Counterpart Application, International Preliminary Report on Patentability dated May 29, 2014, International Application No. PCT/SG2013/000063 filed on Feb. 18, 2013.
(Continued)

*Primary Examiner* — Cam N. Nguyen (57) ABSTRACT

A method of forming a metal oxide composite, the method comprising mixing a metal oxide, at least two monomers and a dispersant to produce a slurry; gel casting the slurry to produce a green metal oxide composite; and sintering the green metal oxide composite to produce the metal oxide composite. A metal oxide composite formed according to the method. Use of the metal oxide composite, for catalyzing hydrolysis of metal borohydride to produce hydrogen.

15 Claims, 9 Drawing Sheets

(51) Int. Cl.
| | |
|---|---|
| C01G 51/02 | (2006.01) |
| C01G 53/04 | (2006.01) |
| C01F 17/00 | (2006.01) |
| B01J 23/00 | (2006.01) |
| B01J 23/08 | (2006.01) |
| B01J 23/40 | (2006.01) |
| B01J 23/42 | (2006.01) |
| C04B 38/00 | (2006.01) |
| C04B 35/50 | (2006.01) |
| C04B 35/51 | (2006.01) |
| B01J 23/755 | (2006.01) |
| C01G 45/12 | (2006.01) |
| H01M 8/06 | (2016.01) |
| C08F 2/44 | (2006.01) |
| B01J 23/889 | (2006.01) |
| B01J 23/75 | (2006.01) |
| B01J 23/78 | (2006.01) |
| B01J 35/00 | (2006.01) |
| B01J 35/02 | (2006.01) |
| B01J 37/00 | (2006.01) |
| C01B 3/06 | (2006.01) |
| C04B 35/01 | (2006.01) |
| C04B 35/12 | (2006.01) |
| C04B 35/486 | (2006.01) |
| C04B 35/626 | (2006.01) |
| C04B 35/632 | (2006.01) |
| B01J 23/10 | (2006.01) |
| B01J 23/34 | (2006.01) |
| C04B 38/02 | (2006.01) |
| C04B 111/00 | (2006.01) |

(52) U.S. Cl.
CPC ........ *B01J 23/75* (2013.01); *B01J 23/78* (2013.01); *B01J 23/8892* (2013.01); *B01J 35/002* (2013.01); *B01J 35/023* (2013.01); *B01J 37/0018* (2013.01); *B01J 37/0036* (2013.01); *B01J 37/0072* (2013.01); *C01B 3/065* (2013.01); *C01G 45/1264* (2013.01); *C04B 35/01* (2013.01); *C04B 35/016* (2013.01); *C04B 35/12* (2013.01); *C04B 35/486* (2013.01); *C04B 35/62695* (2013.01); *C04B 35/6325* (2013.01); *C04B 38/02* (2013.01); *C08F 2/44* (2013.01); *H01M 8/065* (2013.01); *H01M 8/0606* (2013.01); *B01J 2523/00* (2013.01); *C01P 2002/72* (2013.01); *C04B 2111/0081* (2013.01); *C04B 2235/3213* (2013.01); *C04B 2235/3225* (2013.01); *C04B 2235/3227* (2013.01); *C04B 2235/3241* (2013.01); *C04B 2235/3246* (2013.01); *C04B 2235/3262* (2013.01); *C04B 2235/3275* (2013.01); *C04B 2235/3277* (2013.01); *C04B 2235/3279* (2013.01); *C04B 2235/425* (2013.01); *C04B 2235/528* (2013.01); *C04B 2235/6023* (2013.01); *Y02E 60/362* (2013.01); *Y02E 60/50* (2013.01)

(56) References Cited

U.S. PATENT DOCUMENTS

| | | | |
|---|---|---|---|
| 2,534,553 A | 12/1950 | Hogeman | |
| 2,570,882 A | 10/1951 | Stiles | |
| 2,964,378 A | 12/1960 | Brown et al. | |
| 3,331,898 A | 7/1967 | Haas et al. | |
| 4,621,936 A | 11/1986 | Hansson et al. | |
| 4,894,194 A | 1/1990 | Janney | |
| 5,028,362 A | 7/1991 | Janney et al. | |
| 5,145,908 A | 9/1992 | Jenny et al. | |
| 5,322,821 A | 6/1994 | Brezny | |
| 5,502,012 A | 3/1996 | Bert et al. | |
| 6,066,279 A | 5/2000 | Walls et al. | |
| 6,197,073 B1 | 3/2001 | Kadner et al. | |
| 6,457,329 B1 * | 10/2002 | Bhandarkar | C03C 1/006 423/338 |
| 6,534,033 B1 | 3/2003 | Amendola et al. | |
| 6,797,203 B2 | 9/2004 | Vlach et al. | |
| 7,517,489 B2 | 4/2009 | Akash | |
| 7,595,127 B2 * | 9/2009 | Seabaugh | C04B 35/016 264/618 |

FOREIGN PATENT DOCUMENTS

| | | |
|---|---|---|
| CN | 1241876 C | 2/2006 |
| CN | 101066884 A | 11/2007 |

OTHER PUBLICATIONS

Foreign Communication From a Related Counterpart Application, International Search Report dated Jan. 2, 2013, International Application No. PCT/SG2012/000416 filed on Nov. 2, 2012.

Ye, W. et al., "Hydrogen Generation Utilizing Alkaline Sodium Borohydride Solution and Supported Cobalt Catalyst", Journal of Power Sources, 2007, vol. 164.

J. H. Wee, K. Y. Lee, and S. H. Kim, Sodium borohydride as the hydrogen supplier for proton exchange membrane fuel cell systems, Fuel Processing Technology, 87 (2006) 811-819.

H. C. Brown and C. A. Brown, New, Highly Active Metal Catalysts for the Hydrolysis of Borohydride, Journal of the American Chemical Society, 84 (1962) 1493-1494.).

H. I. Schlesinger, H. C. Brown, A. E. Finholt, J. R. Gilbreath, H. R. Hoekstra, and E. K. Hyde, New developments in the chemistry of diborane and of the borohydrides .9. sodium borohydride, its hydrolysis and its use as a reducing agent and in the generation of hydrogen, Journal of the American Chemical Society, 75 (1953) 215-219.).

B. H. Liu and Z. P. Li, A review: Hydrogen generation from borohydride hydrolysis reaction, Journal of Power Sources, 187 (2009) 527-534.).

S. C. Amendola, S. L. Sharp-Goldman, M. S. Janjua, N. C. Spencer, M. T. Kelly, P. J. Petillo, and M. Binder, A safe, portable, hydrogen gas generator using aqueous borohydride solution and Ru catalyst, International Journal of Hydrogen Energy, 25 (2000) 969-975.).

L. Zhang, Y.J. Zhang, Y.D. Zhen and S.P. Jiang, Lanthanum Strontium Manganite Powders Synthesized by Gel-Casting for Solid Oxide Fuel Cell Cathode Materials, J. Am. Ceram. Soc., 90(5) (2007) 1406-1411.

L. Zhang, S.P. Jiang, C.S. Cheng and Y.J. Zhang, Synthesis and Performance of (La0.75Sr0.25)1-x(Cr0.5Mn0.5)O3 Cathode Powders of Solid Oxide Fuel Cells by Gel-Casting Technique, Journal of the Electrochemical Society, 154 (6) (2007) B577-B582.

L. Zhang, H.Q. He, H.G. Wu, C.H. Li and S.P. Jiang, Synthesis and characterization of doped La9ASi6O26.5 (A=Ca, Sr, Ba) oxyapatite electrolyte by a water-based gel-casting route, International Journal of Hydrogen Energy 36 (2011) 6862-6874.).

Foreign Communication From a Related Counterpart Application, Chinese Office Action dated Aug. 5, 2015, CN Application No. 201380018631.X, filed on Sep. 30, 2014.

* cited by examiner

- B sintered @ 1300°C, 1wt.% NaOH + 25wt.% NaBH$_4$ solution
- C sintered @ 1300°C, 5wt.% NaOH + 25wt.% NaBH$_4$ solution
- D sintered @ 1300°C, 10wt.% NaOH + 25wt.% NaBH$_4$ solution
- F sintered @ 1200°C, 1wt.% NaOH + 25wt.% NaBH$_4$ solution
- G sintered @ 1200°C, 5wt.% NaOH + 25wt.% NaBH$_4$ solution
- H sintered @ 1200°C, 10wt.% NaOH + 25wt.% NaBH$_4$ solution
- J sintered @ 1100°C, 1wt.% NaOH + 25wt.% NaBH$_4$ solution
- E sintered @ 1100°C, 5wt.% NaOH + 25wt.% NaBH$_4$ solution
- L sintered @ 1100°C, 10wt.% NaOH + 25wt.% NaBH$_4$ solution

METAL OXIDE COMPOSITE AND A METHOD OF FORMING THEREOF

CROSS-REFERENCE TO RELATED APPLICATIONS

This application is a filing under 35 U.S.C. 371 as the National Stage of International Application No. PCT/SG2013/000063, filed Feb. 18, 2013, entitled "A METAL OXIDE COMPOSITE AND METHOD OF FORMING THEREOF", which claims the benefit of and priority to U.S. Provisional Patent Application No. 61/559,581, filed Feb. 16, 2012, both of which are incorporated herein by reference in their entirety for all purposes.

FIELD OF THE INVENTION

This invention relates to the development of a metal oxide, a method of fabricating the metal oxide and use of such metal oxide for the production of hydrogen from a metal borohydride.

BACKGROUND OF THE INVENTION

Proton exchange membrane fuel cells (PEMFC) are considered to be one of the most promising fuel cell technologies for vehicular machines, unmanned aerial vehicles (UAV), portable power applications and stationary power applications. The use of hydrogen as the feedstock for PEMFC systems is thought to be an environmentally friendly and a clean source of energy. Since hydrogen fuel reacts with oxygen to produce electrical energy and water only and as a result has the potential to solve many environmental problems associated with conventional petroleum based fuels.

At present, high pressure vessels are commonly used for hydrogen fuel storage. However, these high pressure vessels are not ideal for highly portable applications, such as the UAV, owing to a combination of the low hydrogen density (HD) as well as the excessive weight of the high pressure vessels. Due to such problems there is an increasing demand for alternative hydrogen fuel technologies for use in highly portable applications.

Dated back to World War II, while working with Hermann Irving Schlesinger, Nobel Laureate Herbert C. Brown discovered a method for producing sodium borohydride. This discovery led to the development of metal borohydrides as viable hydrogen carriers (U.S. Pat. Nos. 2,461,662, 2,461,663, 2,534,553 and 2,964,378). During the 1990s, sodium borohydride attracted a tremendous amount of attention due to its chemical properties including non-flammability of sodium borohydride solutions, high hydrogen density (HD, 10.8 wt. %) and the high stability of its environmentally safe reaction by-products.

U.S. Pat. No. 6,534,033 describes a hydrogen generation system wherein the hydrolysis of sodium borohydride has been successfully demonstrated. However, hydrogen generation using this system does not appear to be suitable for heavy-duty applications due to issues relating to the handling of water, catalyst reactivity/deactivation and the treatment of by-products. These issues have been further discussed in the following article (J. H. Wee, K. Y. Lee, and S. H. Kim, *Sodium borohydride as the hydrogen supplier for proton exchange membrane fuel cell systems*, Fuel Processing Technology, 87 (2006) 811-819).

It is know that the hydrolysis of sodium borohydride to produce hydrogen may be accelerated with the aid of catalytic materials packed into a reactor. Accordingly, the development of heterogeneous catalysts for the hydrolysis of sodium borohydride to produce hydrogen has become an area of extensive research. In 1962, Brown et al. reported the use of the noble metal ruthenium as a catalyst for accelerating the hydrolysis of sodium borohydride wherein a hydrogen generation rate of 85.4 L min$^{-1}$ g$^{-1}$ was reached (H. C. Brown and C. A. Brown, *New, Highly Active Metal Catalysts for the Hydrolysis of Borohydride*, Journal of the American Chemical Society, 84 (1962) 1493-1494). To-date, ruthenium-based catalysts display the highest catalytic effect on the hydrolysis of sodium borohydride. However, the price of ruthenium is relatively high (RuCl$_3$.nH$_2$O costs approximately 8500 SGD/kg). A recent metal price comparison (June 2011) showed that ruthenium costs approximately 180 USD/oz, while cobalt costs only approximately 16 USD/lb, or a price ratio of ruthenium to cobalt of 180.

In 1953, Schlesinger et al. reported the catalytic effect of manganese, iron, cobalt, nickel and copper chlorides on the hydrolysis of sodium borohydride to generate hydrogen. They disclosed that the catalytic effect of cobalt chloride was higher than that of other metal chlorides, and concluded that the effect of the cobalt salt was ascribed to the catalytic action of cobalt boride (Co$_2$B), which was formed in the initial stages of the reaction (H. I. Schlesinger, H. C. Brown, A. E. Finholt, J. R. Gilbreath, H. R. Hoekstra, and E. K. Hyde, *New Developments In The Chemistry Of Diborane And Of The Borohydrides .9. Sodium Borohydride, Its Hydrolysis And Its Use As A Reducing Agent And In The Generation Of Hydrogen*, Journal of the American Chemical Society, 75 (1953) 215-219).

It appears that the use of cobalt-based catalysts, for sodium borohydride hydrolysis, may be attractive alternatives to ruthenium based catalysts, owing to their high reactivity and cost effectiveness (B. H. Liu and Z. P. Li, *A review: Hydrogen generation from borohydride hydrolysis reaction*, Journal of Power Sources, 187 (2009) 527-534). Various forms of cobalt have been extensively researched in the literature, including chloride-based, metallic-based, boride-based, alloy-based (of boron (B) or nickel (Ni)), phosphorus-doped, carbon-supported, resin-supported, metal oxide-based and thin film-based forms. However disadvantages associated with the price of such nano-size cobalt-based catalysts and the fact that the "spent" catalyst cannot be easily separated or recycled has caused concern for those using such catalysts. Furthermore, the durability of such catalysts has raised concerns, especially when used for multiple harsh start-stop applications (S. C. Amendola, S. L. Sharp-Goldman, M. S. Janjua, N. C. Spencer, M. T. Kelly, P. J. Petillo, and M. Binder, *A safe, portable, hydrogen gas generator using aqueous borohydride solution and Ru catalyst*, International Journal of Hydrogen Energy, 25 (2000) 969-975).

Porous/dense metal oxide beads have also received growing attention in recent years for their potential use as catalyst, catalyst supports, diesel exhaust filters, pen balls, and grinding media. The specific use of the metal oxide beads is often dependent on factors such as the bead dimensions, degree of porosity, nature of the porosity and the metal oxide composition. Fabrication of porous/dense metal oxide beads has been widely demonstrated. For example, U.S. Pat. No. 3,331,898 discloses a method whereby an aqueous sol stream of said compounds is formed into sol droplets of 200~500 μm in size. This is performed by passing the sol stream into an organic drying liquid stream (at an angle to its direction of flow) thus producing a high shearing force on the said sol leading to droplet formation.

U.S. Pat. No. 6,197,073 discloses a method of producing aluminum oxide-based beads. During this method, an acid aluminum oxide sol or an acid aluminum oxide suspension is converted into droplets using a vibrating nozzle plate. Presolidification then occurs, after formation of a bead shape, by laterally blowing over with gaseous ammonia before coagulating in an ammonium solution.

U.S. Pat. No. 4,106,947 discloses a method of fabricating zirconium oxide-based beads by fusion. U.S. Pat. No. 5,502,012 then improved the quality of the zirconium oxide-based beads, fabricated via fusion, by optimizing the composition of raw materials used.

U.S. Pat. No. 4,621,936 discloses the reaction of soluble alginates with a water solution of multivalent metallic salts to form gels. For example, zirconia was added to a solution containing ammonium alginate to form homogeneous slurry. The homogeneous slurry was then dropped into a calcium chloride solution to form spherical beads via a reaction between the ammonium alginate and the alkaline halide. U.S. Pat. No. 6,797,203 also discloses a similar system for fabricating ceramic beads. U.S. Pat. No. 5,322,821 discloses a method for preparing porous ceramic beads from aluminium oxide ($Al_2O_3$) powders by mixing the powders with a surfactant and sodium borate. The mixture is then poured into hydrocarbon oil and emulsified using a high shear agitator at approximately 300 rpm leading to the formation of foam spheres of finer and more uniform size. U.S. Pat. No. 7,517,489 discloses a method for preparing ceramic, metal and mineral beads with a diameter in the range of 0.1-10 mm using one kind of grain flour as binder. Additional methods which employ gel-casting technique are disclosed by Guo et al., (CN 1935478A), Chen et al., (CN 101066884A), and Yang et al., (CN 1241876C). However, these methods include disadvantages since the system set-up can be arduous because the length of hot oil tube needed is approximately 1~10 m in length.

The forming of metal oxides with complex shapes can be a time consuming, expensive and in many cases impractical process. Gel-casting has been demonstrated to be a unique process for forming complex or intricately shaped parts from metal oxide powders. In this process, slurry with a high solid state loading is obtained by dispersing the metal oxide powders in a pre-mixed monomers and cross-linking solution. With heating or addition of a catalyst, cross-linking polymerization occurs to form a three-dimensional network structure, and the slurry is solidified in situ, to form solid objects of the desired shape. The resulting green product is of exceptionally high strength. After drying, the green product can also be further heated to remove the polymer and can also be fired or sintered to produce a metal oxide product. Gel-casting methods have been studied in Janney (U.S. Pat. Nos. 4,894,194, 5,028,362 and 5,145,908) and Claudia (U.S. Pat. No. 6,066,279). During these studies a great amount of attention is focused towards the improving of the gel casting technique, however little effort was paid towards the shape of the product formed.

Gel-casting techniques have been used to synthesize powders for solid oxide fuel cells. This was reported by Zhang et al., where pervoskite powders were synthesized using gel-casting techniques. (L. Zhang, Y. J. Zhang, Y. D. Zhen and S. P. Jiang, *Lanthanum Strontium Manganite Powders Synthesized by Gel-Casting for Solid Oxide Fuel Cell Cathode Materials*, Journal of American Ceramic Society, 90(5) (2007) 1406-1411. L. Zhang, S. P. Jiang, C. S. Cheng and Y. J. Zhang, *Synthesis and Performance of $(La_{0.75}Sr_{0.25})_{1-x}(Cr_{0.5}Mn_{0.5})O_3$ Cathode Powders of Solid Oxide Fuel Cells by Gel-Casting Technique*, Journal of The Electrochemical Society, 154(6) (2007) B577-B582. L. Zhang, H. Q. He, H. G. Wu, C. H. Li and S. P. Jiang, *Synthesis and characterization of doped $La_9ASi_6O_{26.5}$ (A=Ca, Sr, Ba) oxyapatite electrolyte by a water-based gel-casting route*, International Journal of Hydrogen Energy 36 (2011) 6862-6874.)

Due to the high costs, the difficulty in recycling and the adverse environmental factors associated with many nano-sized catalysts there is a need for new forms of metal-oxide-based catalysts and methods for producing them.

SUMMARY OF INVENTION

This technical disclosure seeks to address at least one of the problems in the prior art. In general terms, we disclose a novel method for producing a metal oxide composite.

According to a first aspect, there is a method of forming a metal oxide composite, the method comprising mixing a metal oxide, at least two monomers and a dispersant to produce a slurry; gel casting the slurry to produce a green metal oxide composite; and sintering the green metal oxide composite to produce the metal oxide composite.

The method may further comprise degassing the slurry prior to gel casting the slurry.

The metal oxide may comprise at least one of: a cobalt-based metal oxide, a yttria stabilized zirconia-based metal oxide, a nickel-based metal oxide, and a perovskite-based metal oxide.

The at least two monomers may comprise an acrylamide (AM) and an N,N'-methylenebisacrylamide (MBAM).

The method may further comprise adding at least one of a catalyst and an initiator to the slurry prior to the gel casting.

The Initiator May be an Ammonium Bisulphate (APS) Solution.

The catalyst may be N,N,N',N'-tetramethylethylenediamide (TEMED).

The gel casting may comprise dropping the slurry into a gel casting media to form the green metal oxide composite.

The mixing may further comprise adding a pore former in the mixing, the pore former configured to form pores in the metal oxide composite.

The pore former may comprise graphite powder.

The mixing may further comprise adding at least one sintering additive in the mixing.

The sintering may be carried out at a sintering temperature of between 1100° C. and 1300° C.

According to a second aspect, there is provided a metal oxide composite formed according to the first aspect.

The metal oxide composite may be self-supported.

The metal oxide composite may be in the form of beads.

The metal oxide composite may have a weight percentage greater than 80 wt. %.

According to a third aspect, there is provided a use of the metal oxide composite according to the second aspect, for catalysing hydrolysis of metal borohydride to produce hydrogen gas.

The metal borohydride may be sodium borohydride.

BRIEF DESCRIPTION OF FIGURES

In order that the invention may be fully understood and readily put into practical effect there shall now be described by way of non-limitative example only exemplary embodiments of the present invention, the description being with reference to the accompanying illustrative drawings.

FIGS. 4b1, 4b2, 4d1, 4d2, 4f1 and 4f2 show surface morphologies of cobalt oxide-based beads sintered at 1100° C., 1200° C. and 1300° C. respectively after catalyzing the hydrogen generation from 25 wt. % sodium borohydride with 1 wt. % sodium hydroxide solution at 80° C.;

FIGS. 4b2, 4d2 and 4f2 are magnified images of FIGS. 4b1, 4d1 and 4f1 respectively;

DETAILED DESCRIPTION

Exemplary embodiments of the invention will be described with reference to FIGS. 1 to 14 below.

Figure 1:
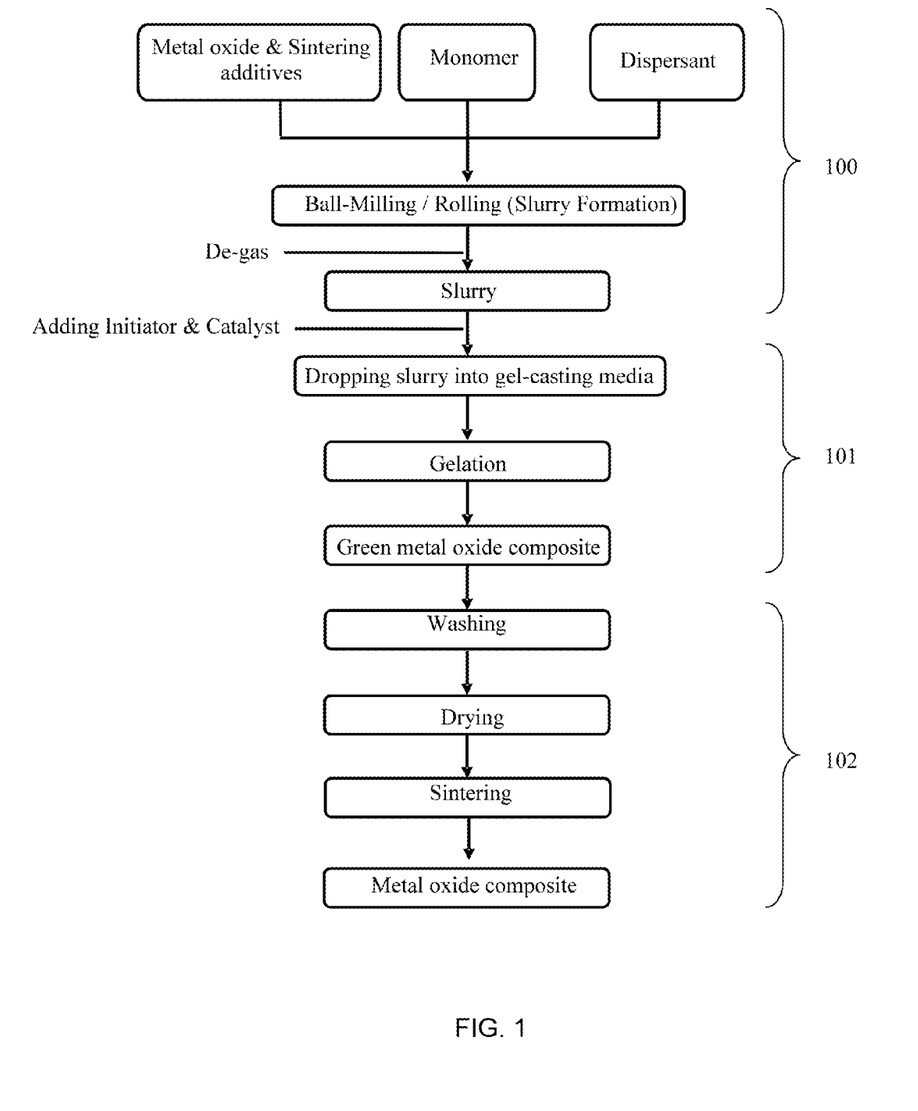
FIG. 1 is a flow chart illustrating a method of forming metal oxide composites via gel casting.

In one aspect, there is provided a method of forming a metal oxide composite. As illustrated in FIG. 1, a metal oxide, sintering additives, at least two monomers and a dispersant may undergo mixing and de-gassing to produce—slurry (100). An initiator and/or catalyst may then be added to the slurry. The slurry may then be dropped into a gel casting media to form the green metal oxide composite via a process of gelation (101). The green metal oxide composite may then be washed, dried and sintered to produce a metal oxide composite (102).

Figure 2:
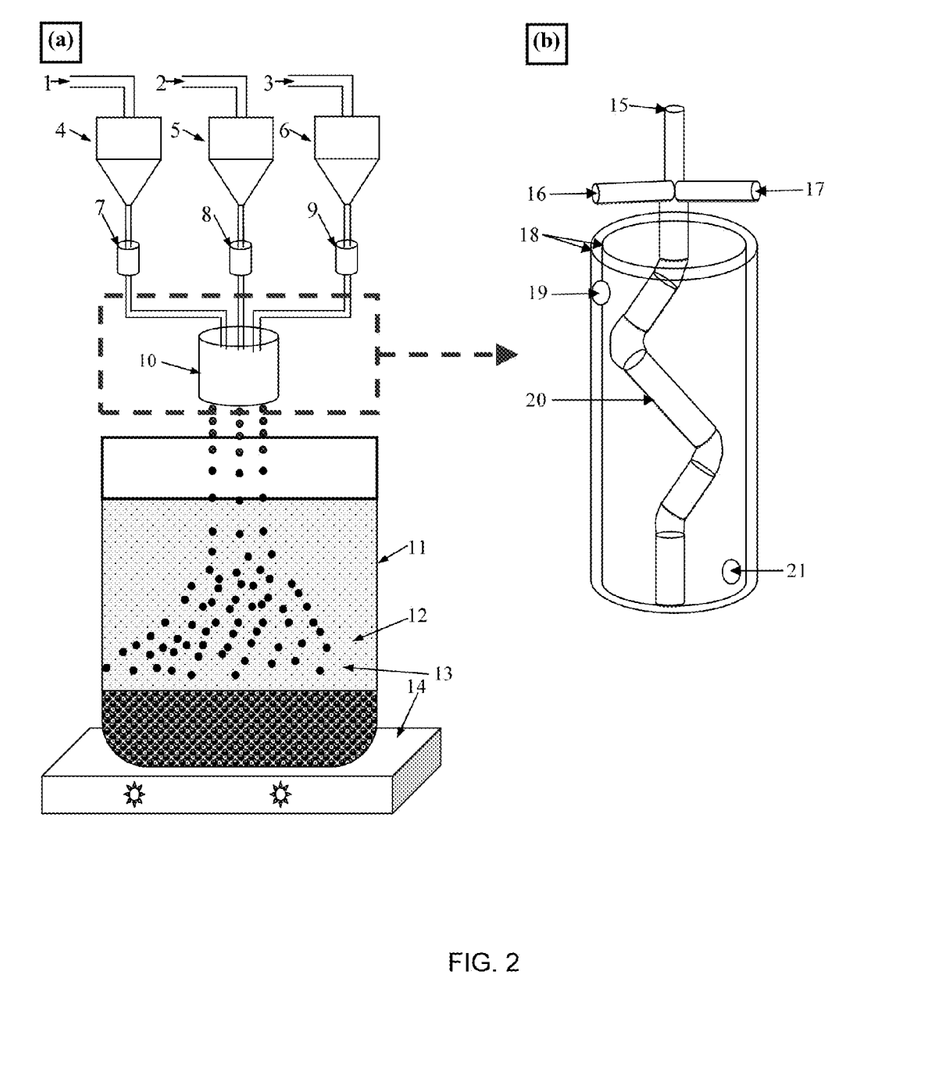
FIG. 2a is a schematic illustration of a gel-casting apparatus and process for metal oxide composite fabrication.
FIG. 2b is a schematic illustration detailing a mixing vessel.

As shown in FIG. 2a, the slurry (as previously described for FIG. 1), can be fed into vessel (4) via inlet (1). An initiator solution is then fed into vessel (5) via inlet (2) and a catalyst solution fed into vessel (6) via inlet (3). The contents of vessels (4), (5) and (6) are then passed into mixing chamber (10) via liquid flow controllers (7), (8) and (9) respectively. The contents of mixing chamber (10) is then dropped into gel casting vessel (11), wherein green metal oxide composites (13) are formed in the presence of a gel-casting media (12). The gel casting may occur at an elevated temperature provided by a heat source (14).

FIG. 2b further illustrates mixing chamber (10) wherein the slurry, initiator solution and catalyst solution can be fed into component (20) via inlet (15), (16) and (17) respectively. Mixing occurs at component (20) and any excess heat can be removed by cooling jacket (18). Coolant enters cooling jacket (18) via inlet (21) and exits via outlet (19).

The method, as illustrated by FIGS. 1, 2a and 2b, may be performed on a large scale enabling the low-cost mass production of metal oxide composite.

The metal oxide may include one or more transition metal oxide or a mixture thereof. The transition metal oxide may comprise of metal elements selected from a group of Fe, Co, Ni, Cu, Ru, Rh and/or mixtures thereof. The metal oxide may also comprise of stabilized metal oxides, metal oxide alloys or a mixture thereof, these may include yttria stabilized zirconia and perovskite. The oxidation states of the metal oxide may be mono, multiple or mixtures thereof.

At least two monomers are used during the mixing (100) and gelation (101) as illustrated in FIG. 1. Exemplary monomers are those that have vinyl or allyl group. Examples of suitable monomers are acrylic acid, methacrylamide, methacrylic acid, methoxy (polyethylene glycol) monomethacrylate, n-vinyl pyrrolidone, acrylamide, alkyl-acrylamides, alkyl-methacrylamides, alkyl-acrylates, alkyl-methacrylates, dimethyl amino ethyl methacrylate, dimethyl aminopropyl methacrylamide, hydroxy-alkyl acrylamides, hydroxy-alkyl methacrylamides, hydroxy-alkyl acrylates, hydroxy-alkyl methacrylates, methacrylatoethyl trimethyl ammonium chloride, methacrylamidopropyl trimethyl ammonium chloride, p-styrene sulfonic acid, p-styrene sulfonic acid salts, or a combination comprising at least one of the aforementioned monomers The monomers may be used in conjunction with a solvent to form a monomer solution. An exemplary solvent is water. Other organic solvents having a polar protic character, polar aprotic character or non-polar character may be used as desired. The monomer solution may also provide a low viscosity vehicle for the metal oxide.

An initiator and/or catalyst may be used during the mixing (100) as illustrated in FIG. 1. The initiator and/or catalyst may be added to the slurry in order to activate polymerization of the monomers. The initiator and/or catalyst may be a free-radical initiator and/or catalyst. Examples of suitable free-radical initiators and/or catalysts may include, but are not limited to, ammonium bisulphate and tetramethylethylenediamine (TEMED) mixtures, ammonium persulfate and tetramethylethylenediamine mixtures, sodium persulfate and tetramethylethylenediamine mixtures, potassium persulfate and tetramethylethylenediamine mixtures, or the like, or a combination comprising at least one of the aforementioned free-radical initiators and catalysts. The initiator and/or catalyst may be used in conjunction with a solvent to form an initiator and/or catalyst solution. Some additives or co-monomers can also initiate polymerization, in which case a separate initiator may not be desired. The initiator can control the reaction in addition to initiating it. The initiator and/or catalyst may also be added to the slurry during the mixing step (100) prior to the gel casting step (101) as illustrated in FIG. 1, therefore ensuring that polymerization of the monomers occurs before the gel casting step (101).

Other initiator and/or catalyst systems may be used to promote polymerization of the monomers. These may include ultraviolet (UV), x-ray, gamma-ray, electron beam, or other forms of radiation, which could serve as suitable polymerization initiators and/or catalysts.

Dispersants may also be added to the slurry to control the flow behaviour, the dispersant allows the slurry to flow more readily. Examples of suitable dispersants may include, but are not limited to, inorganic acids, inorganic bases, organic acids, organic bases, polyacrylic acid, salts of polyacrylic acid, polymethacrylic acid, salts of polymethacrylic acid, copolymers of polyacrylic acid, salts of copolymers of polyacrylic acid, copolymers of polymethacrylic acid, salts of copolymers of polymethacrylic acid, polyethylene imine, polyvinylpyrrolidone, polyacrylamide, lignosulfonates, poly(ethylene oxide), adducts of ethylene oxide, adducts of propylene oxide, polycarboxylates, salts of polycarboxylates, naphthalene sulfonates, sulfosuccinates, polyphosphates, sodium silicates, phosphate esters, or the like, or a combination comprising at least one of the aforementioned dispersants.

The gel casting preferably comprises dropping a slurry into a gel casting media to form a green metal oxide composite as illustrated by FIG. 1. Formation of green metal oxide composites by a gelation step (101) followed by washing, drying and sintering (102) provides metal oxide composite.

The gel casting media (12), as illustrated in FIG. 2a, may be an oil-based media such as enerpac hydraulic oil, for example.

Hydrophobic graphite powders may be added to the oil-based media, as mentioned above. The graphite powders disperse into the oil-based media to provide a graphite-oil media which has a higher density and viscosity than the oil-based media itself. When a slurry, produced in the mixing step (100) illustrated in FIG. 1, is dropped into the graphite-oil media, it displaces the same volume of graphite-oil media than it would the oil-based media. Since the graphite oil-media has a higher density than the oil-based media, the mass displaced by the slurry droplets is increased, which enables the slurry droplets to be suspended or slowly sunk in the graphite-oil media. This allows for the tube to be shortened (to 20-40 cm) when the graphite content of the graphite-oil media is high enough. Accordingly, the system is easily set-up in the lab.

A green metal oxide composite refers to a metal oxide composite before it has been sintered or baked. Examples of suitable sintering temperature ranges include, but are not limited to, 900-1200° C., 1300-1500° C. and 1200-1300° C. Furthermore, examples of suitable sintering atmospheres include, but are not limited to, hydrogen atmospheres, nitrogen atmosphere, argon atmospheres, vacuums, standard conditions, or the like, or a combination comprising at least one of the aforementioned atmospheres.

The mixing (100) as illustrated in FIG. 1 may comprise adding sintering additives. The sintering additives may affect the sintering temperature and dwelling time of the metal oxide composites. Examples of suitable sintering additives include, but are not limited to, calcium carbonate, strontium carbonate, barium carbonate, magnesium carbonate, manganese carbonate, nickleous oxide, iron oxide, lanthanum oxide or the like, or a combination comprising at least one of the aforementioned sintering additives. The addition of sintering additives may also improve the durability and mechanical strength of the metal oxide composites. This allows for the catalytic use of metal oxide composites for prolonged and harsh "stop-start" applications.

The mixing (100), as illustrated in FIG. 1 may comprise adding a pore former. The use of a pore former may help modify the porosity and the mechanical strength of the metal oxide composites. The modified porosity and mechanical strength of the metal oxide composites allows for use in a variety of applications. The pore former may consist of a single pore forming agent or may comprise more than one pore forming agent. The use of at least one pore former during the mixing (100) as illustrated in FIG. 1 may provide the resulting metal oxide composites with interconnected pores (voids) formed upon completion of the sintering (102). The pore former may be sintered out (decomposes or oxidizes and may be converted to a gas such as carbon monoxide or carbon dioxide) to leave behind the metal oxide composite with the desired porosity. Examples of pore formers may include, but are not limited to, starch and graphite powders, or any combination thereof.

According to another aspect, the metal oxide composite may be a self-supported metal oxide composite. The self-supported metal oxide composite eliminates the use of a substrate and a substrate coating (i.e. noble metal catalysts on the substrate). The self supporting structure of the metal oxide composites may provide resistance to compressive or deformation forces. The resistance may be of sufficient magnitude such that the structures may be easily handled and transported without substantial loss of structural integrity. Furthermore, the self-supported metal oxide may be in the form of a bead.

General Method

The metal oxide composites are produced using a novel method as illustrated in FIG. 1. A schematic drawing of the gel-casting process of metal oxide composite fabrication and mixing chamber are shown in FIGS. 2a and 2b. A general method for fabricating metal oxide composites is described below.

Metal oxide and sintering additives are ball-milled in isopropanol for 24 h. A monomer solution is prepared in distilled water and mixed with acrylamide (AM) and N,N'-methylenebisacrylamide (MBAM) with a weight ratio of 5~30:0~1 (AM:MBAM), in one embodiment 15:1. The metal oxide, sintering additives, monomer solution and a suitable amount of dispersant are combined before mixing. The mixture then undergoes planetary ball milling for ≥30 min before de-gassing to afford a homogeneous slurry.

An ammonium persulfate (APS) solution and tetramethylethylenediamide (TEMED) solution are then mixed with the homogenous slurry to afford a mixed slurry. The mixed slurry is then dropped into a hot oil-based media to form green metal oxide composite (as beads). The green metal oxide composite is then filtered, washed, dried and sintered at high temperature to afford metal oxide composites (as beads).

EXAMPLES

Fabrication of Cobalt Oxide-Based Beads

Cobalt oxide-based beads were fabricated using an aqueous gel-casting method including cobalt oxide, nickel oxide and manganese carbonate as raw materials. Cobalt oxide (136 g), nickel oxide (16 g) and manganese carbonate (8 g) were ball milled in iso-propanol for 24 h before drying at 80° C. to afford premixed powders. A monomer solution was then prepared using about 53~28 g distilled water with AM (10 g) ($C_2H_3CONH_2$, Sigma-Aldrich) and MBAM (0.667 g) ($C_2H_3CONHCH_2NHCOC_2H_3$, Sigma-Aldrich). The AM to MBAM weight ratio was 15:1. The premixed powders, monomer solution and dispersant (2~5 g, in one example 2.4 g) were then mixed before the resulting slurry was planetary ball milled for 30 min. Initiator APS (10 g) (($NH_4)_2S_2O_8$) 2 wt. % solution and catalyst TEMED (5 g) 2 wt. % solution were then added to the slurry to afford a mixed slurry. The mixed slurry was then shaped and dropped into an oil-based media via a dropping nozzle. The temperature of the oil-based media was maintained at 80° C. The resulting cobalt oxide beads were then filtered out, washed, dried and sintered at 1100° C., 1200° C. and 1300° C. for 2 h to afford cobalt oxide-based beads.

Figure 3:
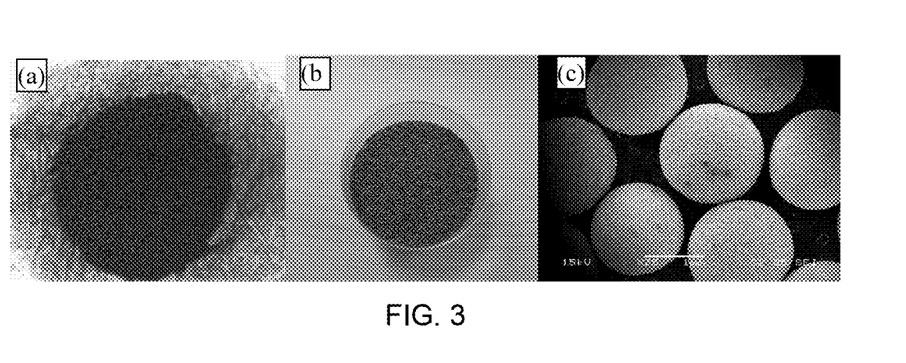
FIG. 3a is an optical photograph of self-supported cobalt oxide-based catalyst beads taken before sintering at 1200° C.
FIG. 3b is an optical photograph the self-supported cobalt oxide-based catalyst beads taken after sintering at 1200° C.
FIG. 3c is an optical photograph depicting microstructure of the cobalt oxide-based beads after sintering at 1200° C. for 2 h in air.

FIG. 3 shows the optical photographs of cobalt oxide-based beads before (3a) and after (3b) sintering at 1200° C. Optical photograph (3c) illustrates that the diameter of the sintered beads are in the range of 1.5~2 mm.

During this method only a ball-milling machine was used to prepare the slurry. As a result the method described involves low capital investment and is also a cost-effective way to produce cobalt oxide based beads in large quantities. Beads with different diameters may be fabricated by modifying the dropping nozzle with the desired tip specifications.

Figure 4:
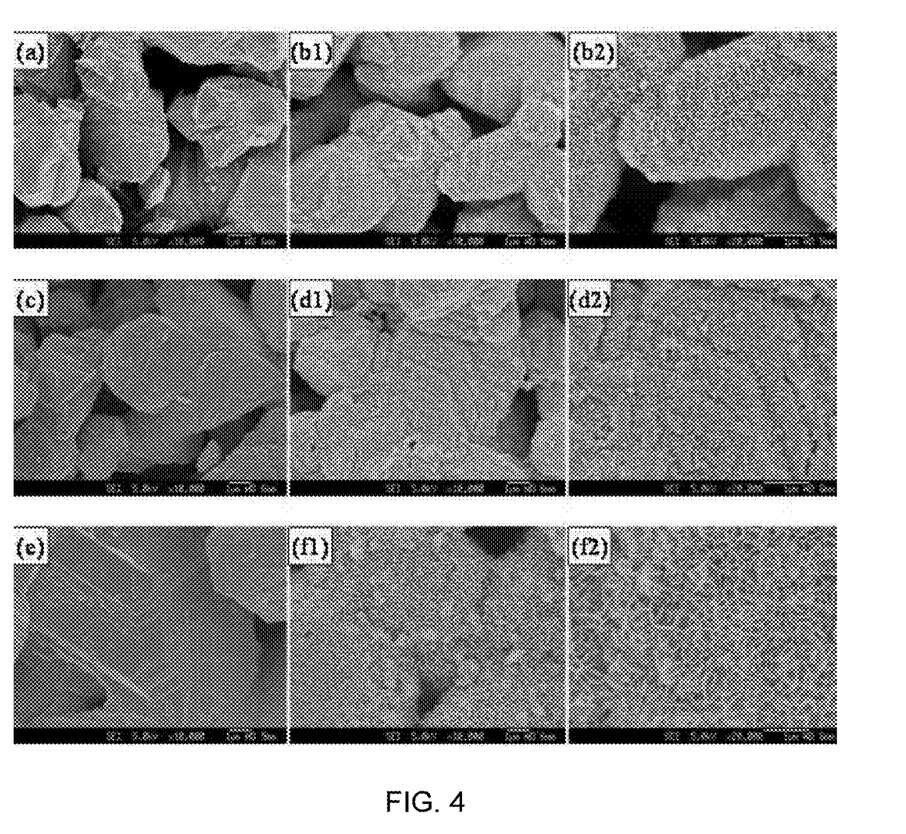
FIGS. 4a, 4c and 4e shows surface morphologies of cobalt oxide-based beads sintered at 1100° C., 1200° C. and 1300° C. respectively before catalyzing the hydrogen generation from 25 wt. % sodium borohydride with 1 wt. % sodium hydroxide solution at 80° C.

FIG. 4 illustrates the surface morphologies of cobalt oxide-based beads sintered at different temperatures, before (images (a), (c) and (e)) and after (images (b1), (b2), (d1), (d2), (f1) and (f2)) catalyzing hydrogen generation from the solution of 25 wt. % sodium borohydride with 1 wt. % sodium hydroxide at 80° C.

It can be seen from FIG. 4 (images (a), (c) and (e)) that the particle size of cobalt oxide increases with an increase in sintering temperature. FIG. 4 (images (b1), (b2), (d1), (d2), (f1) and (f2)) shows the formation of amorphous cobalt boride (Co—B) nano-flake particles on the cobalt oxide surface. This has been reported in the literature (D. G. Tong, W. Chu, Y. Y. Luo, X. Y. Ji, and Y. He, *Effect of crystallinity on the catalytic performance of amorphous Co—B particles prepared from cobalt nitrate and potassium borohydride in the cinnamaldehyde hydrogenation*, Journal of Molecular Catalysis a-Chemical, 265 (2007) 195-204).

The hydrogen generation rate may be related to the surface morphologies as illustrated in FIG. 4, as well as the dimensional and shape effects of the cobalt boride nano-flakes. In turn, since the sintering additives and sintering temperatures affect the microstructure of the cobalt oxide beads, the sintering additives and sintering temperature will also affect the rate of hydrogen generation. Accordingly, the effect of sintering additives on the hydrogen generation rate at 80° C., compressive force and ultimately the catalytic performance of the cobalt oxide based beads can be seen in Table 1.

TABLE 1

| $Co_2O_4$ (g) | NiO (g) | Sintering additive (g) | Sintering Temperature (° C.) | Hydrogen generation rate (mL $min^{-1} g^{-1}$) | Compressive Force (N) |
|---|---|---|---|---|---|
| 128 | 21.33 | $MnCO_3$ (10.67) | 1200 | 7943 | 53.27 |
| 136 | 16 | $MnCO_3$ (8) | 1200 | 8359 | 61.14 |
| 144 | 10.67 | $MnCO_3$ (5.33) | 1200 | 8895 | 81.19 |
| 152 | 5.33 | $MnCO_3$ (2.67) | 1200 | 9385 | 72.59 |
| 85 | 10 | $CaCO_3$ (5) | 1200 | 7138 | 35.0 |
| 85 | 10 | $SrCO_3$ (5) | 1200 | 6469 | 78.8 |
| 85 | 10 | $BaCO_3$ (5) | 1200 | 7723 | 42.5 |
| 85 | 10 | $MgCO_3$ (5) | 1200 | 6534 | 35.3 |
| 85 | 10 | $Fe_2O_3$ (5) | 1200 | 9374 | 10.5 |

Illustrating the effect of the sintering additives on the hydrogen generation rate at 80° C. and compressive force. The hydrogen generation rate was measured for the reaction of 25 wt. % sodium borohydride with 1 wt. % sodium hydroxide solution.

Fabrication of Yttria Stabilized Zirconia (YSZ) Based Beads

The yttria stabilized zirconia (YSZ (8 mol. %)) beads were fabricated using an aqueous gel-casting method. A monomer solution was prepared in 8~17 g distilled water with AM (2.5 g) and MBAM (0.1667 g). The AM to MBAM weight ratio was 15:1. YSZ powders (40 g) were then mixed with the monomer solution and a dispersant (0.5~1.5, in one embodiment 0.63 g), followed by planetary ball milling for 40 min to form a monomers/YSZ mixture. APS (2.5 g) 2 wt. % solution as the initiator and TEMED (0.71 g) 2 wt. % solution as a catalyst, were then added to the monomers/YSZ mixture to form a mixed slurry. The mixed slurry was then dropped, via a nozzle, into an oil-based media maintained at 80° C. The resulting beads were then filtered, washed, dried and then sintered at 1500° C. for 4 h to afford YSZ based beads.

Fabrication of Porous Nickel Oxide-Based Beads

Porous nickel oxide-based beads were fabricated using an aqueous gel-casting method. Nickel oxide (50 g, 99.9%) and the pore former graphite powder (5 g) were then ball milled in iso-propanol for 24 h before drying at 80° C. to afford premixed powders. A monomer solution was then prepared in 9~21 g distilled water with AM (3.44 g) and MBAM (0.23 g). The AM to MBAM weight ratio was 15:1. The premixed powders (55 g) were then mixed with the monomer solution and dispersant (0.6~2.8 g, in one embodiment 0.86 g), followed by planetary ball milling for 30 min. APS (3.44 g) 2 wt. % solution was added as the initiator and TEMED (1.72 g) 2 wt. % solution was added as the catalyst. The resulting slurry was then dropped, via a nozzle, into an oil-based media maintained at 80° C. The resulting beads were then filtered out, washed, dried and sintered at 1380° C. for 4 h to afford porous nickel oxide-based beads.

Fabrication of Nickel Oxide/YSZ Based Beads

Nickel oxide/YSZ beads were fabricated using an aqueous gel-casting method including nickel oxide, graphite and YSZ as raw materials. Nickel oxide (32.5 g, 99.9%), YSZ (17.5 g), and pore former graphite powders (5 g), were ball milled in iso-propanol for 24 h before being dried at 80° C. to afford premixed powders. A monomer solution was then prepared in 10~23 g distilled water with AM (3.44 g) and MBAM (0.23 g). The AM to MBAM weight ratio was 15:1. Then premixed powders (55 g) were then mixed with the monomer solution and dispersant (0.6~3.0 g, in one embodiment 0.86 g), followed by planetary ball milling for 30 min. APS (3.44 g) 2 wt. % solution was added as the initiator and TEMED (1.72 g) 2 wt. % solution was added as the catalyst. The resulting slurry was then dropped, via a nozzle, into an oil-based media maintained at 80° C. The resulting beads were then filtered out, washed, dried and sintered at 1380° C. for 4 h to afford NiO/YSZ beads.

Figure 5:
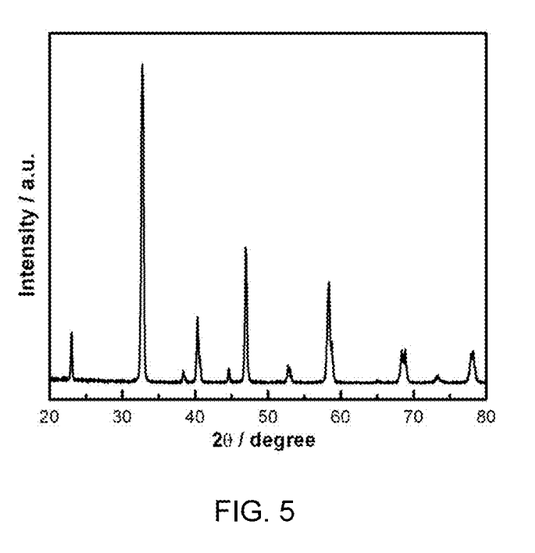
FIG. 5 shows XRD patterns of $La_{0.75}Sr_{0.25}Cr_{0.5}Mn_{0.5}O_{3-\delta}$ (LSCM oxide) beads sintered at 1400° C. for 6 h in air.

Fabrication of $La_{0.75}Sr_{0.25}Cr_{0.5}Mn_{0.5}O_{3-\delta}$ (LSCM Oxide) Beads LSCM oxide beads were fabricated using an aqueous gel-casting method including $La_2O_3$ (99.9%), $SrCO_3$ (99.9%), Cr$_2$O$_3$ (99%), and MnCO$_3$ (99%) (all from Sigma-Aldrich) as raw materials. La$_2$O$_3$ (36.65 g), SrCO$_3$ (11.07 g), Cr$_2$O$_3$ (11.40 g) and MnCO$_3$ (17.24 g) were ball milled in iso-propanol for 24 h before drying at 80° C. to afford premixed powders (in-situ synthesized LSCM perovskite oxide). A monomer solution was then prepared using 13~33 g distilled water with AM (4.77 g) and MBAM (0.32 g). The AM to MBAM weight ratio was 15:1. The premixed powders were then mixed with the monomer solution and a dispersant (0.8~3.2 g, in one embodiment 1.19 g) before planetary ball milling for 30 minutes. APS (1.42 g) 2 wt. % solution was added as the initiator and TEMED (2.38 g) 2 wt. % solution was added as the catalyst. The resulting slurry was then dropped, via a nozzle, into an oil-based media maintained at 80° C. The resulting beads were then filtered out, washed, dried and sintered at 1400° C. for 6 h to afford LSCM oxide beads. The XRD pattern of LSCM oxide beads can be seen in FIG. 5.

Figure 6:
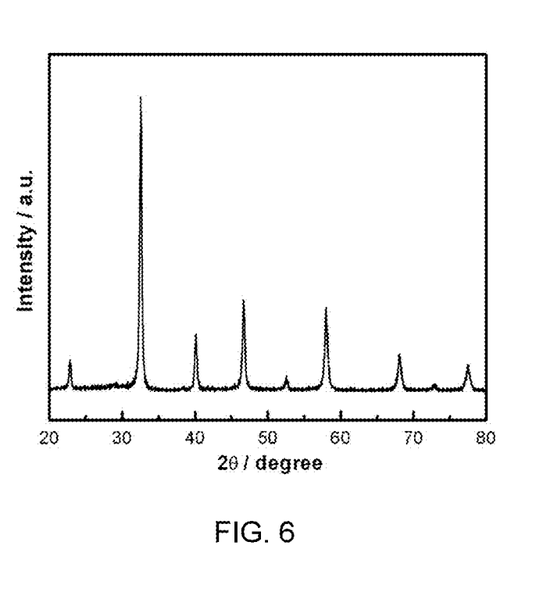
FIG. 6 shows XRD patterns of $La_{0.6}Sr_{0.4}Ti_{0.5}Mn_{0.5}O_{3-\delta}$ (LSTM oxide) beads sintered at 1350° C. for 6 h in air.

Fabrication of La$_{0.6}$Sr$_{0.4}$Ti$_{0.5}$Mn$_{0.5}$O$_{3-\delta}$ (LSTM Oxide) Beads LSTM oxide beads were fabricated using an aqueous gel-casting method including La$_2$O$_3$ (99.9%), SrCO$_3$ (99.9%), TiO$_2$ (99.6%), and MnCO$_3$ (99%) (all from Sigma-Aldrich) as raw materials. Starting materials La$_2$O$_3$ (6.52 g), SrCO$_3$ (3.94 g), TiO$_2$ (2.66 g) and MnCO$_3$ (3.83 g) were ball milled in iso-propanol for 24 h before drying at 80° C. to afford premixed powders (in-situ synthesized LSTM perovskite oxide). A monomer solution was prepared using 3~7.5 g distilled water with AM (1.42 g) and MBAM (0.094 g). The premixed powders were then mixed with the monomer solution and a dispersant (0.25 g) before planetary ball milling for 30 min. APS (1.42 g) 2 wt. % solution was added as the initiator. TEMED (0.71 g) 2 wt. % solution was added as the catalyst. The resulting slurry was then dropped, via a nozzle, into an oil-based media maintained at 80° C. to afford LSTM oxide beads. The resulting beads were then filtered out, washed, dried and sintered at 1350° C. for 4 h. The XRD pattern of LSTM perovksite oxide beads can be seen in FIG. 6.

Figure 7:
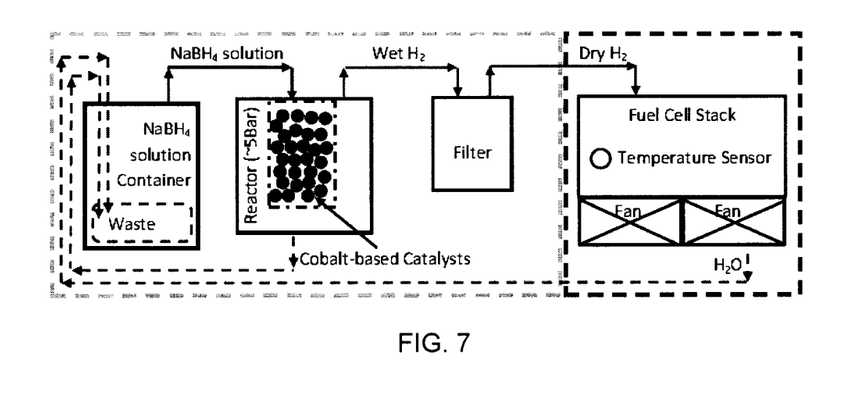
FIG. 7 is a schematic of a hydrogen generation system and a fuel cell stack.

Setting up a Hydrogen Generation System and Fuel Cell Stack for Characterization Studies of the Cobalt Oxide-Based Beads Catalytic Performance FIG. 7 illustrates a process of hydrolysis sodium borohydride using self-supported cobalt oxide-based beads as catalysts. The sintered cobalt oxide-based beads are activated in a sodium hydroxide stabilized sodium borohydride solution at 60° C. for 10 min. The activated cobalt oxide-based beads are then placed in a reactor. Hydrogen gas is generated via the hydrolysis of the sodium borohydride solution and is catalysed by the cobalt oxide-based beads in the reactor. The hydrogen generated is then passed through a filter before being consumed by the fuel cell stack.

Figure 8:
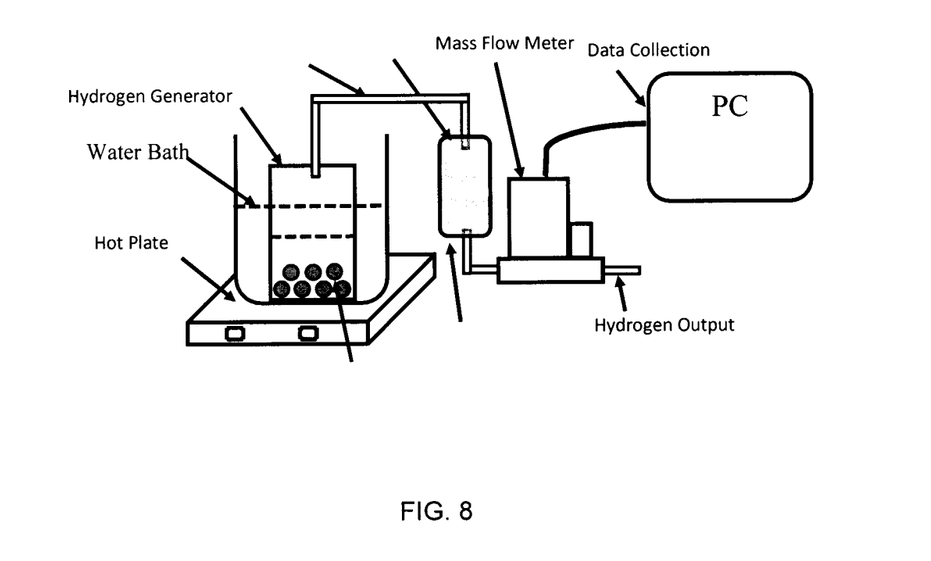
FIG. 8 shows a set-up of the laboratory test arrangement.

FIG. 8 shows the set-up of the laboratory test rig. The mass flow controller is very sensitive to moisture therefore the hydrogen gas needs to be dehumidified before entering the mass flow controller.

Characterization of Cobalt Oxide-Based Beads

Figure 9:
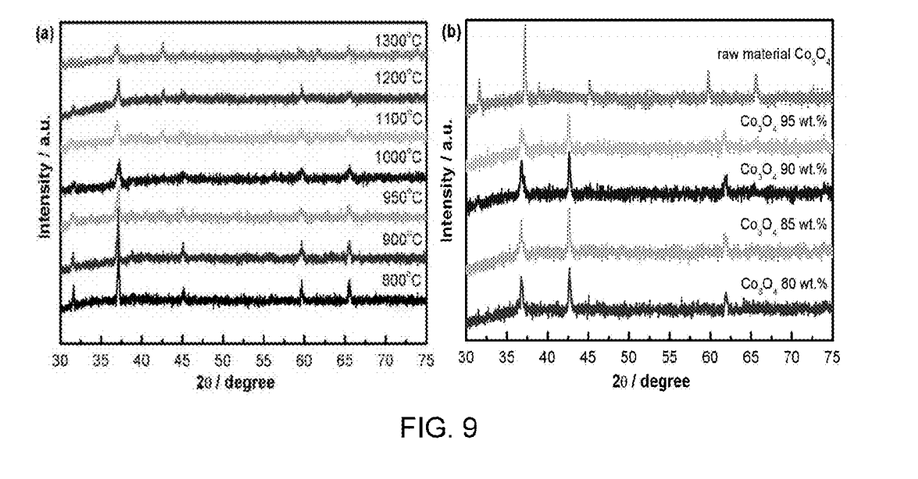
FIG. 9a shows XRD patterns of $Co_3O_4$ sintered at different temperatures for 2 h in air.
FIG. 9b shows cobalt oxide based-beads crushed and ground into fine powders with different cobalt oxide concentrations sintered at 1200° C. in air for 2 h.

FIG. 9a shows the XRD patterns of raw cobalt oxide powders baked at different temperatures for 2 h in air. FIG. 9b shows the XRD patterns of cobalt oxide-based beads (crushed and ground into fine powders) with different cobalt oxide weight percentage (wt. %) (sintered at 1200° C. in air for 2 h). As shown in FIG. 9a, the cobalt oxide (Co$_3$O$_4$) phase starts to transform to the CoO phase when the baking temperature is elevated to 950° C.

It can be seen from FIG. 9b, that the XRD patterns of cobalt oxide-based beads (with varying cobalt oxide weight percentage) are different from the raw material cobalt oxide (Co$_3$O$_4$). This is consistent with the reported data of CoO (JCPDS Card No. 75-0533) where there is no secondary phase detected, which indicates that cobalt oxide (Co$_3$O$_4$) structure completely transferred into CoO phase. Sintering additives, nickel oxide and manganese oxide, did not affect the crystal structure of CoO.

An important consideration for the cobalt oxide-based beads is its ability to continuously perform for more than 100 h at a pressure of approximately 5 bar. Cobalt oxide-based beads with a low mechanical strength may be susceptible to crushing, which may cause a number of problems including degradation in performance and the blocking of gas pipes. This may cause the build up of hydrogen gas pressure at a rapid rate, which may be dangerous.

Figure 10:
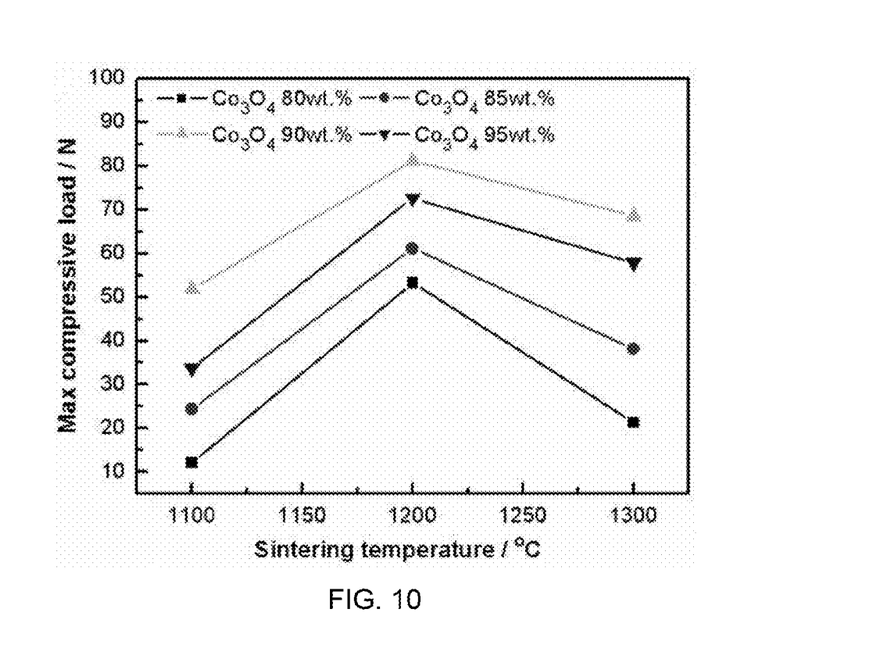
FIG. 10 illustrates a maximum compressive load (N) of cobalt oxide-based beads sintered at different temperatures for 2 h in air with different cobalt oxide weight percentage.

FIG. 10 shows the maximum compressive load (N) of cobalt oxide based-beads (sintered at different temperature for 2 h in air) with different cobalt oxide weight percentages. It can be seen that the maximum compressive load of cobalt oxide-based beads increases with an increase in the cobalt oxide (Co$_3$O$_4$) weight percentage. This reaches a maximum at a cobalt oxide weight percentage of 90 wt. %. The maximum compressive load then decreases when the cobalt oxide (Co$_3$O$_4$) weight percentage is higher than 90 wt. %.

The sintering temperature may also affect the mechanical strength of cobalt oxide-based beads. The experiments reveal that the optimal sintering temperature for a maximum compressive load is 1200° C. (as shown in FIG. 10).

The hydrolysis reaction of sodium borohydride is shown as follows:

NaBH$_4$(37.8)+2H$_2$O(36)→4H$_2$(8)+NaBO$_2$(65.8)

Figure 11:
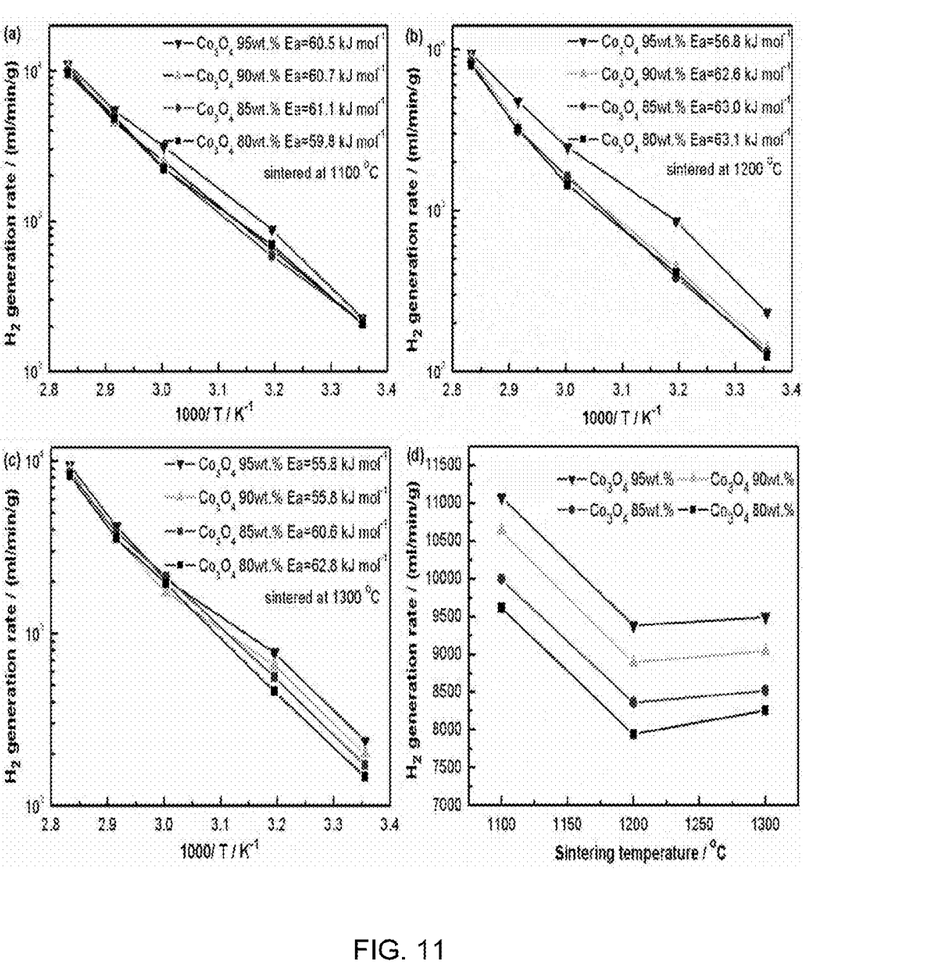
FIGS. 11a, 11b and 11c show activation energy plots of hydrogen generation rate of cobalt oxide-based beads with varying cobalt oxide weight percentage sintered at different reaction temperatures and reaction conditions being 1 wt. % sodium hydroxide+25 wt. % sodium borohydride solution.
FIG. 11d is a plot illustrating an averaged hydrogen generation rate of cobalt oxide-based catalytic beads with varying cobalt oxide weight percentage at different sintering temperature and reaction conditions being 80° C. in 1 wt. % sodium hydroxide+25 wt. % sodium borohydride solution.

The effects of the reaction temperature on hydrogen generation when using cobalt oxide-based beads as catalysts are given in FIG. 11. According to the Arrhenius equation, the reaction rate constant can be written as:

$k=k_0 \exp(-E_a/RT)$

Where k$_0$ is the pre-exponential parameter, Ea is the activation energy of the reaction, R is the universal gas constant, and T is the reaction temperature.

The activation energy calculated from the slopes of the curves (illustrated in FIGS. 11a, 11b, 11c) is in the range of 55-63 kJ mol$^{-1}$. This is lower than that of 70.4 kJ mol$^{-1}$ for Pt/LiCoO$_2$ and 68.5 kJ mol$^{-1}$ for Ru/LiCoO$_2$ found in the literature. Please note that ruthenium-based catalysts and platinum-based catalysts are traditionally used to speed up the hydrolysis of sodium borohydride. As shown in FIG. 11d, the hydrogen generation rate increases with an increase in cobalt oxide weight percentage. It is very interesting to note that the hydrogen generation rate is lowest when the compressive load reaches the maximum value (at a sintering temperature of 1200° C. as shown in FIG. 11), which may be due to the microstructure of the cobalt oxide-based beads.

Figure 12:
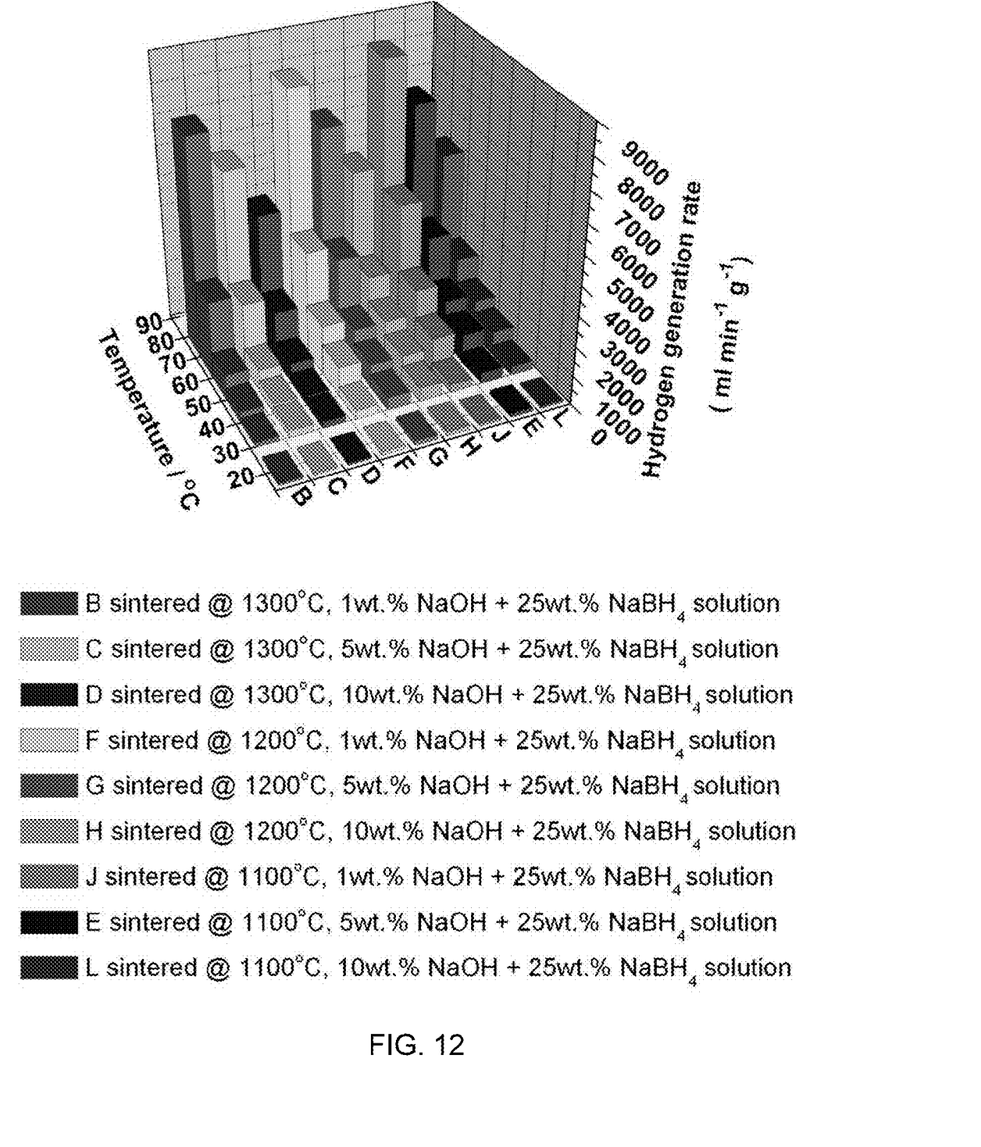
FIG. 12 illustrates the effects of sodium hydroxide (NaOH) concentration on the hydrogen generation rate at different reaction temperatures when using 85 wt. % cobalt oxide-based beads sintered at different temperatures in 25 wt. % sodium borohydride ($NaBH_4$) solution.

The effect of the sodium hydroxide (NaOH) concentration on the hydrogen generation rate at reaction temperatures between 25~80° C. using 85 wt. % cobalt oxide-based beads (with varying sintering temperatures) in 25 wt. % sodium borohydride (NaBH$_4$) solution can be seen in FIG. 12. FIG. 12 shows that the hydrogen generation rate from the hydrolysis of the sodium borohydride (NaBH$_4$) solution decreases slightly as the sodium hydroxide (NaOH) concentration increases. This may be due to the reduced activity of water and the reduced solubility of the by-product sodium metaborate (NaBO$_2$) at higher sodium hydroxide (NaOH) concentrations.

Figure 13:
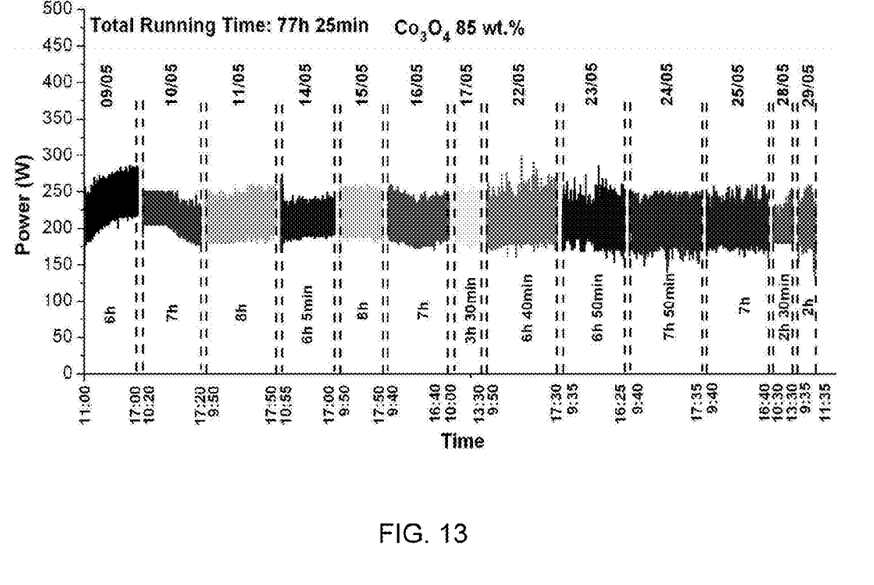
FIG. 13 shows power output (200 W) from a commercial fuel cell system complete with a hydrogen-on-demand reactor when using cobalt oxide-based beads (85 wt. % cobalt oxide weight percentage) over 77 h 25 minutes.

The long term stability and catalytic performance of cobalt oxide-based beads containing 85 wt. % cobalt oxide ($Co_3O_4$) has been conducted in a commercial product. Cobalt oxide beads (~35 g) were placed in a reactor linked to a 200 W proton exchange membrane fuel cell (PEMFC) stack application. The power output from the PEMFC stack is shown in FIG. 13. The 200 W PEMFC stack was successfully operated using the hydrogen generated from the hydrolysis of sodium borohydride ($NaBH_4$), catalysed with the cobalt oxide-based beads, for over 77 h.

Figure 14:
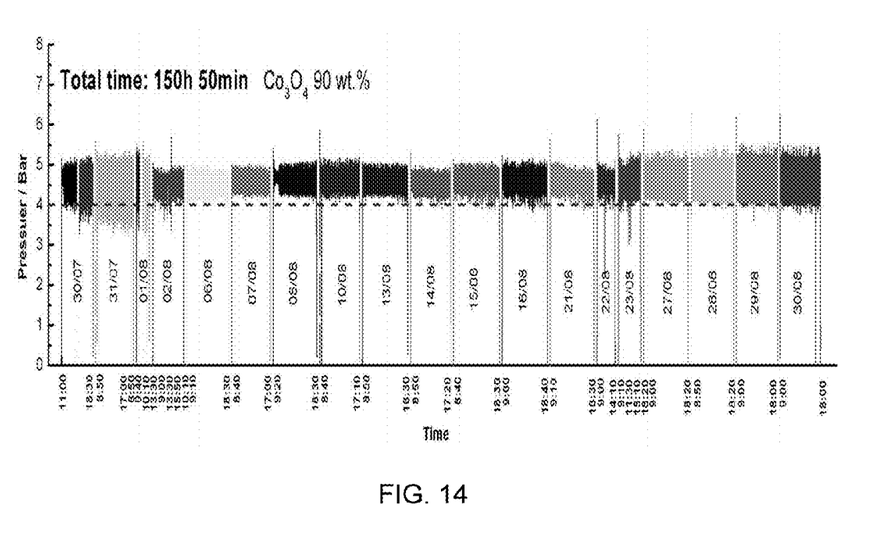
FIG. 14 shows pressure of a hydrogen condenser when using cobalt oxide-based beads (90 wt. % cobalt oxide weight percentage) over 150 h 50 minutes, with hydrogen generation from the hydrogen generator to make sure the pressure of the hydrogen condenser is under 4 Bar.

The long term stability and catalytic performance of cobalt oxide-based beads containing 90 wt. % cobalt oxide ($Co_3O_4$) has also been conducted in a commercial hydrogen generator. Cobalt oxide based-beads (~28.8 g) were placed in a reactor and the hydrogen condenser pressure was monitored to ensure that it remained over 4 Bar. As shown in FIG. 14, the testing was successfully operated for more than 150 h.

REFERENCES

- U.S. Pat. No. 2,461,662
- U.S. Pat. No. 2,461,663
- U.S. Pat. No. 2,534,553
- U.S. Pat. No. 2,964,378
- U.S. Pat. No. 6,534,033
- J. H. Wee, K. Y. Lee, and S. H. Kim, *Sodium borohydride as the hydrogen supplier for proton exchange membrane fuel cell systems*, Fuel Processing Technology, 87 (2006) 811-819.
- H. C. Brown and C. A. Brown, *New, Highly Active Metal Catalysts for the Hydrolysis of Borohydride*, Journal of the American Chemical Society, 84 (1962) 1493-1494).
- H. I. Schlesinger, H. C. Brown, A. E. Finholt, J. R. Gilbreath, H. R. Hoekstra, and E. K. Hyde, *New developments in the chemistry of diborane and of the borohydrides .9. sodium borohydride, its hydrolysis and its use as a reducing agent and in the generation of hydrogen*, Journal of the American Chemical Society, 75 (1953) 215-219).
- B. H. Liu and Z. P. Li, *A review: Hydrogen generation from borohydride hydrolysis reaction*, Journal of Power Sources, 187 (2009) 527-534).
- U.S. Pat. No. 2,570,882
- S. C. Amendola, S. L. Sharp-Goldman, M. S. Janjua, N. C. Spencer, M. T. Kelly, P. J. Petillo, and M. Binder, *A safe, portable, hydrogen gas generator using aqueous borohydride solution and Ru catalyst*, International Journal of Hydrogen Energy, 25 (2000) 969-975).
- U.S. Pat. No. 3,331,898
- U.S. Pat. No. 6,197,073 B1
- U.S. Pat. No. 5,502,012
- U.S. Pat. No. 4,621,936
- U.S. Pat. No. 6,797,203 B2
- U.S. Pat. No. 5,322,821
- U.S. Pat. No. 7,517,489
- CN 101066884A
- CN 1241876C
- U.S. Pat. No. 4,894,194
- U.S. Pat. No. 5,028,362
- U.S. Pat. No. 5,145,908
- U.S. Pat. No. 6,066,279
- L. Zhang, Y. J. Zhang, Y. D. Zhen and S. P. Jiang, *Lanthanum Strontium Manganite Powders Synthesized by Gel-Casting for Solid Oxide Fuel Cell Cathode Materials*, J. AM. Ceram. Soc., 90(5) (2007) 1406-1411.
- L. Zhang, S. P. Jiang, C. S. Cheng and Y. J. Zhang, *Synthesis and Performance of $(La_{0.75}Sr_{0.25})_{1-x}(Cr_{0.5}Mn_{0.5})O_3$ Cathode Powders of Solid Oxide Fuel Cells by Gel-Casting Technique*, Journal of The Electrochemical Society, 154 (6) (2007) B577-B582.
- L. Zhang, H. Q. He, H. G. Wu, C. H. Li and S. P. Jiang, *Synthesis and characterization of doped $La_9ASi_6O_{26.5}$ (A=Ca, Sr, Ba) oxyapatite electrolyte by a water-based gel-casting route*, International Journal of Hydrogen Energy 36 (2011) 6862-6874)

The invention claimed is:

1. A method of forming a metal oxide composite in the form of beads, the method comprising:
   mixing a metal oxide, at least two monomers and a dispersant to produce a slurry;
   gel casting the slurry to produce a green metal oxide composite; wherein the gel casting comprises dropping the slurry into a gel casting media to form the green metal oxide composite as beads; and
   sintering the green metal oxide composite to produce the metal oxide composite in the form of beads;
   wherein the gel casting media comprises a graphite-oil media; and
   wherein the metal oxide comprises at least one of: a cobalt-based metal oxide, a yttria stabilized zirconia-based metal oxide, a nickel-based metal oxide, and a perovskite-based metal oxide.

2. The method according to claim 1, further comprising degassing the slurry prior to gel casting the slurry.

3. The method according to claim 1, wherein the at least two monomers comprises an acrylamide (AM) and an N,N'-methylenebisacrylamide (MBAM).

4. The method according to claim 1, further comprising adding at least one of a catalyst and an initiator to the slurry prior to the gel casting.

5. The method according to claim 4, wherein the initiator is an ammonium persulphate solution.

6. The method according to claim 4, wherein the catalyst is N,N,N',N'-tetramethylethylenediamine (TEMED).

7. The method according to claim 1, wherein the mixing further comprises adding a pore former in the mixing, the pore former configured to form pores in the metal oxide composite.

8. The method according to claim 7, wherein the pore former comprises graphite powder.

9. The method according to claim 1, wherein the mixing further comprises adding at least one sintering additive in the mixing.

10. The method according to claim 1, wherein the sintering is carried out at a sintering temperature of between 1100° C. and 1300° C.

11. The method according to claim 1, further comprising catalysing hydrolysis of metal borohydride to produce hydrogen gas using the metal oxide composite.

12. The method according to claim 11, wherein the metal borohydride is sodium borohyride.

13. A metal oxide composite formed according to the method of claim 1.

14. The metal oxide composite according to claim 13, wherein the metal oxide composite is self-supported.

15. The metal oxide composite according to claim 13, wherein the metal oxide has a weight percentage greater than 80 wt. %.

* * * * *